(12) United States Patent
Boragno et al.

(10) Patent No.: US 10,030,109 B2
(45) Date of Patent: Jul. 24, 2018

(54) POLYPROPYLENE COMPOSITE

(71) Applicant: Borealis AG, Vienna (AT)

(72) Inventors: Luca Boragno, Linz (AT); Cornelia Tranninger, Pucking (AT); Markus Gahleitner, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 2 days.

(21) Appl. No.: 15/115,929

(22) PCT Filed: Feb. 6, 2015

(86) PCT No.: PCT/EP2015/052476
§ 371 (c)(1),
(2) Date: Aug. 2, 2016

(87) PCT Pub. No.: WO2015/121160
PCT Pub. Date: Aug. 20, 2015

(65) Prior Publication Data
US 2017/0166711 A1    Jun. 15, 2017

(30) Foreign Application Priority Data

Feb. 14, 2014 (EP) .................................... 14155222

(51) Int. Cl.
*C08J 5/04* (2006.01)
*C08L 23/14* (2006.01)

(52) U.S. Cl.
CPC .............. *C08J 5/043* (2013.01); *C08L 23/14* (2013.01); *C08J 2323/14* (2013.01); *C08J 2423/26* (2013.01)

(58) Field of Classification Search
CPC ....... C08L 23/14; C08J 5/045; C08J 2323/14; C08J 2423/26
USPC ...................................................... 524/528
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,693,838 A | 12/1997 | Sangokoya et al. |
| 5,731,253 A | 3/1998 | Sangokoya |
| 5,731,451 A | 3/1998 | Smith et al. |
| 5,744,656 A | 4/1998 | Askham |

(Continued)

FOREIGN PATENT DOCUMENTS

| | | |
|---|---|---|
| EP | 0 045 977 B1 | 1/1987 |
| EP | 0 260 130 A1 | 3/1988 |

(Continued)

OTHER PUBLICATIONS

Japanese Patent Office, Office Action issued in Japanese Application No. 2016-550557 (Dispatch Date: Feb. 24, 2017) 4 pp.
U.S. Appl. No. 14/911,295, filed Feb. 10, 2016.
U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.

(Continued)

*Primary Examiner* — Angela C Scott
(74) *Attorney, Agent, or Firm* — Leydig, Voit & Mayer, Ltd.

(57) ABSTRACT

Fiber reinforced composition comprising (a) a polypropylene random copolymer comprising ethylene and/or $C_4$ to $C_8$ a-olefin (PP-RACO), (b) glass fibers (GF), and (c) a polar modified polypropylene as adhesion promoter (AP), wherein (i) the polypropylene random copolymer comprising ethylene and/or C4 to C8 a-olefin (PP-RACO) heaving a melt flow rate $MFR_2$ (230° C.) measured according to ISO 1133 of at least 2.5 g/10 min, (ii) the glass fibers (GF) are cut glass fibers and (iii) the polymer contained in the reinforced composition forms a continuous phase being the matrix of the fiber reinforced composition.

11 Claims, 2 Drawing Sheets

(56) References Cited

U.S. PATENT DOCUMENTS

| | | |
|---|---|---|
| 6,316,562 B1 | 11/2001 | Munck et al. |
| 6,586,528 B1 | 7/2003 | Delaite et al. |
| 6,642,317 B1 | 11/2003 | Delaite et al. |
| 7,342,078 B2 | 3/2008 | Schottek et al. |
| 7,569,651 B2 | 8/2009 | Schottek et al. |
| 8,309,659 B2 * | 11/2012 | Masarati ............ C08L 23/10 264/328.1 |
| 9,751,962 B2 | 9/2017 | Wang et al. |
| 9,828,698 B2 | 11/2017 | Wang et al. |
| 2003/0149199 A1 | 8/2003 | Schottek et al. |
| 2004/0033349 A1 | 2/2004 | Henderson |
| 2005/0136274 A1 | 6/2005 | Hamulski et al. |
| 2005/0187367 A1 | 8/2005 | Hori et al. |
| 2005/0200046 A1 | 9/2005 | Breese |
| 2006/0020096 A1 | 1/2006 | Schottek et al. |
| 2006/0182987 A1 | 8/2006 | Yu et al. |
| 2006/0211801 A1 | 9/2006 | Miller et al. |
| 2007/0235896 A1 | 10/2007 | McLeod et al. |
| 2008/0214767 A1 | 9/2008 | Mehta et al. |
| 2010/0029883 A1 | 2/2010 | Krajete et al. |
| 2010/0081760 A1 | 4/2010 | Rhee et al. |
| 2010/0099824 A1 | 4/2010 | Helland et al. |
| 2011/0031645 A1 | 2/2011 | Kuettel et al. |
| 2012/0189830 A1 | 7/2012 | Niepelt et al. |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0347943 A1 | 12/2016 | Wang et al. |
| 2016/0347944 A1 | 12/2016 | Wang et al. |
| 2017/0029980 A1 | 2/2017 | Wang et al. |
| 2017/0137617 A1 | 5/2017 | Wang et al. |
| 2017/0218172 A1 | 8/2017 | Wang et al. |

FOREIGN PATENT DOCUMENTS

| | | | |
|---|---|---|---|
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594 218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 1 358 252 B1 | 4/2012 |
| EP | 2 308 923 B1 | 5/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| JP | H9-268248 A | 10/1997 |
| JP | 2010-513634 A | 4/2010 |
| WO | WO 1987/007620 A1 | 12/1987 |
| WO | WO 1992/012182 A1 | 7/1992 |
| WO | WO 1992/013029 A1 | 8/1992 |
| WO | WO 1992/019653 A1 | 11/1992 |
| WO | WO 1992/019658 A1 | 11/1992 |
| WO | WO 1992/019659 A1 | 11/1992 |
| WO | WO 1992/021705 A1 | 12/1992 |
| WO | WO 1993/011165 A1 | 6/1993 |
| WO | WO 1993/011166 A1 | 6/1993 |
| WO | WO 1993/019100 A1 | 9/1993 |
| WO | WO 1994/010180 A1 | 5/1994 |
| WO | WO 1994/014856 A1 | 7/1994 |
| WO | WO 1994/016009 A1 | 7/1994 |
| WO | WO 1995/012622 A1 | 5/1995 |
| WO | WO 1995/032994 A1 | 12/1995 |
| WO | WO 1997/010248 A1 | 3/1997 |
| WO | WO 1997/014700 A1 | 4/1997 |
| WO | WO 1997/028170 A1 | 8/1997 |
| WO | WO 1997/036939 A1 | 10/1997 |
| WO | WO 1998/012234 A1 | 3/1998 |
| WO | WO 1998/016359 A1 | 4/1998 |
| WO | WO 1998/038041 A1 | 9/1998 |
| WO | WO 1998/040331 A1 | 9/1998 |
| WO | WO 1998/046616 A1 | 10/1998 |
| WO | WO 1998/047929 A1 | 10/1998 |
| WO | WO 1998/049208 A1 | 11/1998 |
| WO | WO 1998/056831 A1 | 12/1998 |
| WO | WO 1998/058971 A1 | 12/1998 |
| WO | WO 1998/058976 A1 | 12/1998 |
| WO | WO 1998/058977 A1 | 12/1998 |
| WO | WO 1999/010353 A1 | 3/1999 |
| WO | WO 1999/012981 A1 | 3/1999 |
| WO | WO 1999/019335 A1 | 4/1999 |
| WO | WO 1999/024478 A1 | 5/1999 |
| WO | WO 1999/024479 A1 | 5/1999 |
| WO | WO 1999/033842 A1 | 7/1999 |
| WO | WO 1999/041290 A1 | 8/1999 |
| WO | WO 2000/034341 A2 | 6/2000 |
| WO | WO 2000/068315 A1 | 11/2000 |
| WO | WO 2001/048034 A2 | 7/2001 |
| WO | WO 2001/058970 A1 | 8/2001 |
| WO | WO 2001/070395 A2 | 9/2001 |
| WO | WO 2002/002576 A1 | 1/2002 |
| WO | WO 2002/051912 A1 | 7/2002 |
| WO | WO 2002/057342 A2 | 7/2002 |

(56) References Cited

FOREIGN PATENT DOCUMENTS

| | | |
|---|---|---|
| WO | WO 2003/000754 A1 | 1/2003 |
| WO | WO 2003/000755 A2 | 1/2003 |
| WO | WO 2003/000756 A2 | 1/2003 |
| WO | WO 2003/000757 A1 | 1/2003 |
| WO | WO 2003/051934 A2 | 6/2003 |
| WO | WO 2003/054035 A1 | 7/2003 |
| WO | WO 2003/066698 A1 | 8/2003 |
| WO | WO 2003/082879 A1 | 10/2003 |
| WO | WO 2004/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A2 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/053644 A1 | 5/2010 |
| WO | WO 2010/082943 A1 | 7/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/050119 A1 | 4/2013 |
| WO | WO-2013064364 A1 * | 5/2013 ............ C08L 23/12 |
| WO | WO 2013/092615 A1 | 6/2013 |
| WO | WO 2013/092620 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |

OTHER PUBLICATIONS

U.S. Appl. No. 15/113,907, filed Jul. 25, 2016.
U.S. Appl. No. 15/113,922, filed Jul. 25, 2016.
U.S. Appl. No. 15/310,283, filed Nov. 10, 2016.
U.S. Appl. No. 15/514,641, filed Mar. 27, 2017.
Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28:1128-1134 (2007).
Cheng, "$^{13}$C NMR Analysis of Ethylene—Propylene Rubbers," *Macromolecules* 17:1950-1955 (1984).
Fujiyama et al., "Effect of Molecular Parameters on the Shrinkage of Injection-Molded Polypropylene," *J. Appl. Polym. Sci.* 22:1225-1241 (1978).
Galli et al., "Technology: driving force behind innovation and growth of polyolefins," *Prog. Polym. Sci.* 26:1287-1336 (2001).
Resconi et al., "Selectivity in Propene Polymerization with Metallocene Catalysts," *Chem. Rev.* 100(4)1253-1345 (2000).
Singh et al., "Triad sequence determination of ethylene-propylene copolymers—application of quantitative $^{13}$C NMR," *Polymer Testing* 28(5):475-479 (2009).
Wang et al., "Structural Analysis of Ethylene/Propylene Copolymers Synthesized with a Constrained Geometry Catalyst," *Macromolecules* 33:1157-1162 (2000).
Zhou et al., "A new decoupling method for accurate quantification of polyethylene copolymer composition and triad sequence distribution with $^{13}$C NMR," *J. Magnet. Reson.* 187:225-233 (2007).
European Patent Office, International Search Report in International Application No. PCT/EP2015/052476 (dated Apr. 2, 2015).
European Patent Office, Written Opinion in International Application No. PCT/EP2015/052476 (dated Apr. 2, 2015).
European Patent Office, International Preliminary Report on Patentability—Chapter II, in International Application No. PCT/EP2015/052476 (dated Jan. 27, 2016).
"Glossary of Basic Terms in Polymer Science (IUPAC Recommendations 1996)," *Pure Appl. Chem.*, 68(8):1591-1595 (1996).
"MDO Film—Oriented PE and PP packaging film," IN0128/GB FF 2004 10, Borealis A/S (2004).
Abiru et al., "Microstructural Characterization of Propylene-Butene-1 Copolymer Using Temperature Rising elution Fractionation," *J. Appl. Polymer Sci* 68:1493-1501 (1998).
Atwood, "Chapter 6: Anionic and Cationic Organoaluminum Compounds," *Coord. Chem. Alum.*, VCH, New York, NY, pp. 197-232 (1993).
Britovsek et al., "The Search for New-Generation Olefin Polymerization Catalysts: Life beyond Metallocenes," *Angew. Chem, Int. Ed.*, vol. 38(4), pp. 428-447 (1999).
Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Castignolles et al., "Detection and quantification of branching in polyacrylates by size-exclusion chromatography (SEC) and melt-state $^{13}$C NMR spectroscopy," *Polymer*, 50(11):2373-2383, (2009).
Cimmino et al., "Thermal and mechanical properties of isotactic random propylene-butene-1 copolymers," *Polymer* 19:1222-1223 (1978).
Crispino et al., "Influence of Composition on the Melt Crystallization of Isotactic Random Propylene/1-Butene Copolymers," *Makromol. Chem.* 181:1747-1755 (1980).
Filip et al., "Heteronuclear decoupling under fast MAS by a rotor-synchronized Hahn-echo pulse train, "*J. Magnet. Reson.* 176:239-243 (2005).
Gahleitner et al., "Nucleation of Polypropylene Homo- and Copolymers," *International Polymer Processing* 26(1):2-20 (2011).

(56) References Cited

OTHER PUBLICATIONS

Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).

Griffin et al., "Low-load rotor-synchronised Hahn-echo pulse train (RS-HEPT) [1]H decoupling in solid-state NMR: factors affecting MAS spin-echo dephasing times," *Magn. Reson. Chem.* 45:S198-S208 (2007).

Holbrey et al., "Liquid clathrate formation in ionic liquid-aromatic mixtures," *Chem. Comm.*, 2003, pp. 476-477.

Kakugo et al., "$^{13}$C NMR Determination of Monomer Sequence Distribution in Ethylene-Propylene Copolymers Prepared with $\delta$-TiCl$_3$-Al(C$_2$H$_5$)$_2$Cl," *Macromolecules* 15:1150-1152 (1982).

Klimke et al., "Optimisation and Application of Polyolefin Branch Quantification by Melt-State $^{13}$C NMR Spectroscopy," *Macromol. Chem. Phys.* 207(4):382-395 (2006).

Mcauley et al., "On-line Inference of Polymer Properties in an Industrial Polyethylene Reactor," *AIChE Journal*, vol. 37, No. 6, pp. 825-835 (1991).

Myhre et al., "Oriented PE films—Expanding Opportunities with Borstar® PE," Maack Speciality Films, pp. 1-10 (2001).

Parkinson et al., "Effect of Branch Length on $^{13}$C NMR Relaxation Properties in Molten Poly[ethylene-co-($\alpha$-olefin)] Model Systems," *Macromol. Chem. Phys.* 208(19-20):2128-2133 (2007).

Periodic Table (IUPAC 2007).

*Plastics Additives Handbook*, 5th edition, Hans Zweifel, Editor, Hanser Publishers, Munich, pp. 871-873 (2001).

*Plastics Additives Handbook*, 5th edition, Hans Zweifel, Editor, Hanser Publishers, Munich, pp. 956-965 (2001).

Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

"Polyethylene Lumicene® mPE M5510 EP," *Total Refining & Chemicals, Total Ecosolutions*, Belgium, Aug. 2013 (2 pgs.).

*Propylene Handbook*, 2$^{nd}$ Edition, Chapter 7.2.2 "Oriented Films," pp. 405-415, Nello Pasquini, Editor, Hanser (2005).

Randall, "A Review of High Resolution Liquid [13]Carbon Nuclear Magnetic Resonance Characterizations of Ethylene-Based Polymers," *JMS-Rev. Macromol. Chem. Phys.*, C29(2 & 3):201-317 (1989).

Resconi et al., "Diastereoselective Synthesis, Molecular Structure, and Solution Dynamics of meso- and rac-[Ethylenebis(4,7-dimethyl-$\eta$5-1-indenyl)]zirconium Dichloride Isomers and Chain Transfer Reactions in Propene Polymerization with the rac Isomer," *Organometallics* 15(23):5046-5059 (1996).

Resconi et al., "Highly Regiospecific Zirconocene Catalysts for the Isospecific Polymerization of Propene," *JACS* 120(10):2308-2321 (1998).

Spaleck et al., "The Influence of Aromatic Substituents on the Polymerization Behavior of Bridged Zirconocene Catalysts," *Organometallics* 13:954-963 (1994).

Spear et al., "Liquid Clathrates," *Encyclopedia of Supramolecular Chemistry*, J.L. Atwood and J.W. Steed (Eds.); Marcel Dekker: New York, pp. 804-808 (2004).

\* cited by examiner

Figure 1:
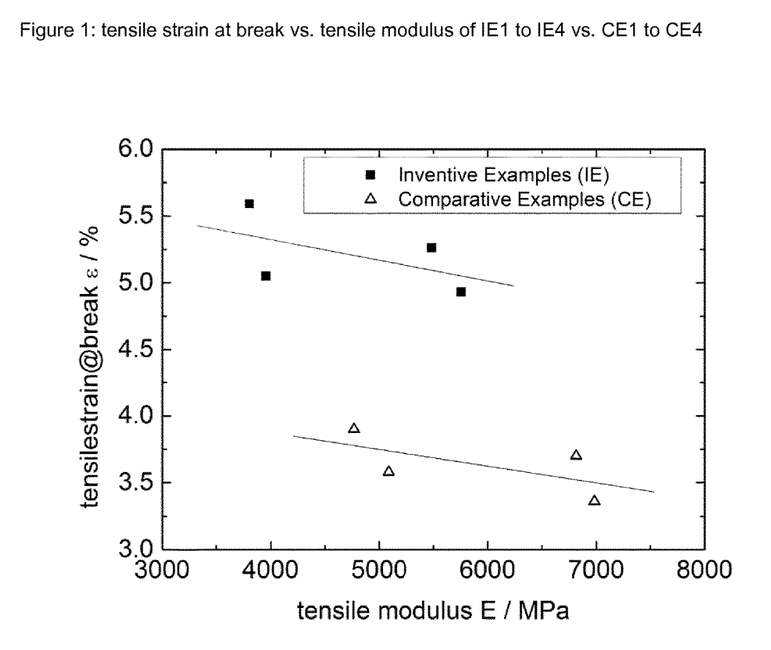

Figure 1: tensile strain at break vs. tensile modulus of IE1 to IE4 vs. CE1 to CE4

Figure 2:
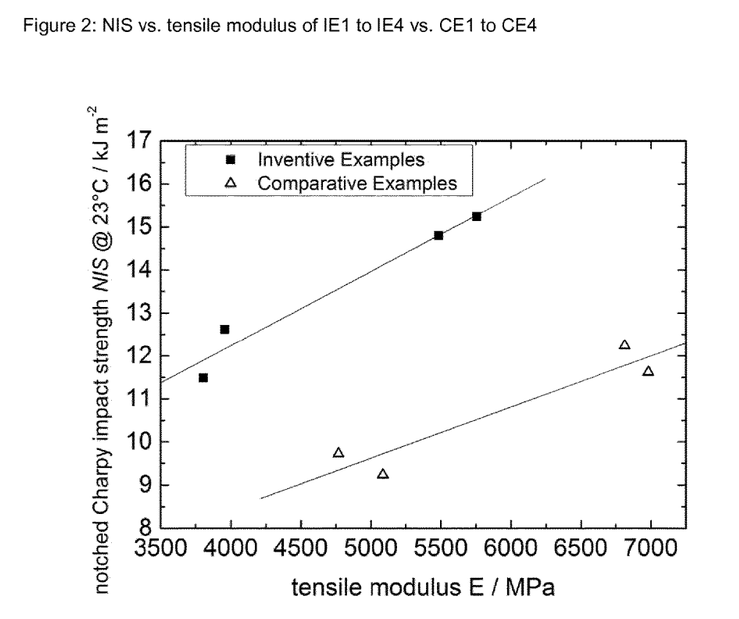

Figure 2: NIS vs. tensile modulus of IE1 to IE4 vs. CE1 to CE4

POLYPROPYLENE COMPOSITE

CROSS-REFERENCE TO RELATED APPLICATIONS

This patent application is the U.S. national phase of International Application No. PCT/EP2015/052476, filed on Feb. 6, 2015, which claims the benefit of European Patent Application No. 14155222.4, filed Feb. 14, 2014, the disclosures of which are incorporated herein by reference in their entireties for all purposes.

The present invention is directed to a fiber reinforced polypropylene composition with excellent impact/stiffness balance and reduced emissions as well as to its preparation and use.

Polypropylene is a material used in a wide variety of technical fields, and reinforced polypropylenes have in particular gained relevance in fields previously exclusively relying on non-polymeric materials, in particular metals. One particular example of reinforced polypropylenes are glass fiber reinforced polypropylenes. Such materials enable a tailoring of the properties of the composition by selecting the type of polypropylene, the amount of glass fiber and sometimes by selecting the type of coupling agent used. Accordingly, nowadays glass-fiber reinforced polypropylene is a well-established material for applications requiring high stiffness, heat deflection resistance and resistance to both impact and dynamic fracture loading (examples include automotive components with a load-bearing function in the engine compartment, support parts for polymer body panels, washing machine and dishwasher components). However one drawback of the commercial available fiber reinforced material is its limited flowability and processability. The fact that there is a clear negative correlation between glass fiber content (usually ranging between 10 and 40 wt.-%) and flowability (MFR) makes the forming of thin-wall or otherwise delicate parts difficult or impossible.

There is a need in the art to have glass fiber (GF) reinforced polypropylene (PP) grades combining an excellent impact/stiffness balance with an increased tenacity. A key parameter in this context is the strain at break (or elongation at break, EB) which normally is at a very low level, i.e. <3.0%) for PP/GF grades.

This goal is generally considered to be difficult to achieve because the coupling in PP/GF composites achieved by a chemical reaction between the GF sizing (surface coating) and the normally applied adhesion promoter is limiting the deformation of the matrix polymer. The limit in deformation becomes even stronger with increasing glass fiber content, but the coupling quality on the other hand is decisive for the stiffness and impact resistance (toughness) of the material.

Further nowadays the polymer processors desire material with low emissions to fulfil the consistently rising demands of regulatory authorities as well as consumers.

Fujiyama M. and Kimura S. describe in "Effect of Molecular Parameters on the Shrinkage of Injection-Molded Polypropylene" (J. Appl. Polym. Sci. 22 (1978) 1225-1241) compositions of PP homopolymers, random and impact copolymers with glass fibers which have been investigated in terms of shrinkage. The polymers are characterized very superficially only, and the glass fibers not at all; mechanical data are missing.

WO 98/16359 A1 describes rod-shaped PP pellets containing glass and PP fibers, the fibers having the length of the pellets. The core contains a mixture of GF with PP fibers, the fibers being a PP homopolymer or a random copolymer with ≤10 wt. % $C_2$ or $C_4$-$C_{10}$ as comonomer, while the sheath comprises a PP homopolymer and/or a random copolymer with ≤10 wt. % $C_2$ or $C_4$-$C_{10}$ as comonomer and/or a PP impact copolymer with ≤27 wt. % $C_2$ or $C_4$-$C_{10}$ as comonomer. Long glass fibers (LGF) as used in this case are generally more difficult to process and deliver parts with a very high degree of orientation and mechanical anisotropy.

EP 2062936 A1 describes PP glass fiber compositions with ≥15 wt. % glass fibers and a heterophasic PP composition comprising a matrix phase and at least two disperse elastomer components with a total comonomer content of ≥12 wt. % and a comonomer content in the elastomer phase of ≥20 wt. %. While demonstrating good impact strength, the described compositions still show a very limited strain at break.

EP 2308923 B1 describes fiber reinforced compositions comprising (a) an EP-heterophasic copolymer, (b) a PP homo- or copolymer with MFR≥500, and (c) fibers having good flowability. As in case of the EP 2062936 A1, the described compositions show a very limited strain at break.

Accordingly, although much development work has been done in the field of fiber reinforced polypropylene compositions, there still remains the need for further improved PP/GF grades.

Thus, the object of the present invention is to provide a fiber reinforced composition with excellent elongation at break. It is further an object of the present invention to obtain an improved balance of mechanical properties, like flexural modulus, impact strength and elongation at break and at the same time reduced emissions.

The finding of the present invention is that a fibrous reinforced material with excellent impact/stiffness balance and reduced emissions can be obtained with fibers embedded in a monophasic alpha-olefin propylene random copolymer, whereby the alpha-olefin propylene random copolymer is produced in the presence of a metallocene catalyst.

Thus the present invention is directed to a fiber reinforced composition comprising
(a) 50.0 to 84.5 wt. % of a metallocene catalyzed polypropylene random copolymer comprising ethylene and/or $C_4$ to $C_8$ α-olefin (PP-RACO),
(b) 15.0 to 45.0 wt. % glass fibers (GF) and
(c) 0.5 to 5.0 wt. % a modified polypropylene as adhesion promoter (AP),
based on the total weight of the fiber reinforced composition,
wherein
(i) the polypropylene random copolymer comprising ethylene and/or $C_4$ to $C_8$ α-olefin (PP-RACO) has a melt flow rate $MFR_2$ (230° C.) measured according to ISO 1133 of at least 2.5 g/10 min up to 15.0 g/10 min,
(ii) the glass fibers (GF) are cut glass fibers and
(iii) the complete polymer contained in the reinforced composition forms a continuous phase being the matrix of the fiber reinforced composition.

Propylene Random Copolymer (PP-RACO)

The polypropylene random copolymer comprising ethylene and/or $C_4$ to $C_8$ α-olefin (PP-RACO) has a melt flow rate $MFR_2$ (230° C.) measured according to ISO 1133 in the range of at least 2.5 g/10 min up to 15.0 g/10 min, preferably in the range of 3.0 g/10 min to 12.0 g/10 min and more preferably in the range of 5.0 g/10 min to 10.0 g/10 min.

It is also possible that more than one sort of PP-RACO is used, as long as all used PP-RACOs form one single phase, and as long as the complete monophase fulfills the physical and chemical requirements as described herein for the polypropylene random copolymer comprising ethylene and/or $C_4$ to $C_8$ α-olefin (PP-RACO). However it is especially preferred that just one sort of PP-RACO is used in the present fiber reinforced composition.

The polypropylene random copolymer (PP-RACO) comprises, preferably consists of, propylene and a comonomer selected from ethylene and/or at least one $C_4$ to $C_8$ α-olefin, preferably at least one comonomer selected from the group consisting of ethylene, 1-butene, 1-pentene, 1-hexene and 1-octene, more preferably ethylene and/or 1-butene and most preferably ethylene. Thus, in a preferred embodiment the propylene random copolymer (PP-RACO) according to this invention comprises units derivable from ethylene and propylene only.

The comonomer content of the polypropylene random copolymer (PP-RACO) is within the range of 1.0 to 10.0 wt. % of ethylene and/or $C_4$ to $C_8$ α-olefin comonomer.

Preferably the comonomer content is in the range of 2.0 to 9.8 wt. %, more preferably in the range of 2.2 to 9.5 wt. % and still more preferably in the range of 2.5 to 9.0 wt. %.

Furthermore the polypropylene random copolymer (PP-RACO) has a xylene cold soluble content (XCS) in the range of 10.0 to 25.0 wt. %, preferably in the range of 10.5 to 23.0 wt. % and more preferably in the range of 11.0 to 20.0 wt. %.

Further the propylene random copolymer (PP-RACO) has a melting temperature measured according to ISO 11357-3 of at least 135° C., preferably of at least 140° C. and more preferably of at least 142° C. The melting temperature will normally not be higher than 160° C.

Further the propylene random copolymer (PP-RACO) is preferably characterized by a relatively narrow molecular weight distribution as determined by size exclusion chromatography (SEC). The ratio between weight average molecular weight (Mw) and number average molecular weight (Mn) is normally called polydispersity (Mw/Mn) and is preferably in the range of 1.5 to 6.5, more preferably in the range of 2.0 to 6.0, and still more preferably in the range of 2.5 to 5.5.

Additionally the propylene random copolymer (PP-RACO) is preferably characterized by its monophasic nature, meaning the absence of a separated elastomer phase otherwise typical for the high impact polypropylene compositions as described in the above cited documents EP 2062936 A1 and EP 2308923 B1. The presence or absence of such a separated elastomer phase can for example be detected in high resolution microscopy, like electron microscopy or atomic force microscopy, or by dynamic mechanical thermal analysis (DMTA). Specifically in DMTA the presence of a monophase structure can be identified by the presence of only one distinct glass transition temperature (Tg). For the PP-RACO according to the present invention, Tg will normally be in the range of −12 to +2° C. More preferably, the PP-RACO will not have a Tg below −20° C.

A suitable propylene random copolymer (PP-RACO) according to this invention is preferably produced in a sequential polymerization process in the presence of a metallocene catalyst, more preferably in the presence of a catalyst (system) as defined below.

The term "sequential polymerization process" indicates that the propylene random copolymer (PP-RACO) is produced in at least two reactors, preferably in two or three reactors, connected in series. Accordingly the present process comprises at least a first reactor (R1) and a second reactor (R2), as well as optionally a third reactor (R3). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) is preferably a gas phase reactor (GPR). Such gas phase reactor (GPR) can be any mechanically mixed or fluid bed reactor. For example the gas phase reactor (GPR) can be a mechanically agitated fluid bed reactor with gas velocities of at least 0.2 m/sec. Thus it is appreciated that the gas phase reactor is a fluidized bed type reactor, optionally with a mechanical stirrer.

In a further embodiment a third reactor (R3) being a second gas phase reactor (GPR2), connected in series with the first gas phase reactor (GPR), is used.

Thus in a preferred embodiment the first reactor (R1) is a slurry reactor (SR), like a loop reactor (LR), whereas the second reactor (R2) is a gas phase reactor (GPR), optionally connected in series with a second gas phase reactor (GPR2). Accordingly for the instant process at least two up to three polymerization reactors, namely a slurry reactor (SR), like a loop reactor (LR), and a gas phase reactor (GPR) and optionally a second gas phase reactor (GPR2) are connected in series. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell described e.g. in FIG. 20 of the paper by Galli and Vecello, Prog. Polym. Sci. 26 (2001) 1287-1336.

Preferably, in the instant process for producing the propylene copolymer (R-PP) as defined above the conditions for the first reactor (R1), i.e. the slurry reactor (SR), like a loop reactor (LR), of step (a) may be as follows:

the temperature is within the range of 40° C. to 110° C., preferably between 60° C. and 100° C., like 68 to 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR) and optionally subsequently to the second gas phase reactor (GPR2), whereby the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The residence time can vary in the reaction zones identified above.

In one embodiment of the process for producing the propylene random copolymer (PP-RACO) the residence time the first reactor (R1), i.e. the slurry reactor (SR), like a loop reactor (LR), is in the range 0.2 to 4 hours, e.g. 0.3 to 1.5 hours and the residence time in the gas phase reactor(s) (GPR and optional GPR2) will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactor(s) (GPR and optional GPR2).

Preferably the process comprises also a prepolymerization with the chosen catalyst system, as described in detail below.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 40° C., and more preferably from 10 to 23° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

The polymerization takes place in the presence of a metallocene catalyst system, said metallocene catalyst system, comprises (i) an asymmetrical complex of formula (I)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$-hydrocarbyl, tri($C_{1-20}$-alkyl)silyl, $C_{6-20}$-aryl, $C_{7-20}$-arylalkyl or $C_{7-20}$-alkylaryl;

$R^2$ and $R^{2'}$ are each independently a $C_{1-20}$ hydrocarbyl radical optionally containing one or more heteroatoms from groups 14-16;

$R^{5'}$ is a $C_{1-20}$ hydrocarbyl group optionally containing one or more heteroatoms from groups 14-16 and optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ and $R^{7'}$ are each independently hydrogen or $C_{1-20}$ hydrocarbyl group optionally containing one or more heteroatoms from groups 14-16;

Ar is an aryl or heteroaryl group having up to 20 carbon atoms optionally substituted by one or more groups $R^1$;

Ar' is an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$; and each $R^4$ is a $C_{1-20}$ hydrocarbyl group, and

(ii) optionally a cocatalyst (Co) comprising an element (E) of group 13 of the periodic table (IUPAC), preferably a cocatalyst (Co) comprising a compound of Al.

As mentioned above the catalyst must comprise an asymmetrical complex. Additionally the catalyst may comprise a cocatalyst.

Preferably the molar-ratio of cocatalyst (Co) to the metal (M) of the complex, like Zr, [Co/M] is below 500, more preferably in the range of more than 100 to below 500, still more preferably in the range of 150 to 450, yet more preferably in the range of 200 to 450.

Concerning the preparation of the catalyst composition as defined above reference is made to WO 2010/052260.

The metallocene complex, especially the complexes defined by the formulas specified in the present invention, used for manufacture of the polypropylene random copolymer (PP-RACO) are asymmetrical. That means that the two indenyl ligands forming the metallocene complex are different, that is, each indenyl ligand bears a set of substituents that are either chemically different, or located in different positions with respect to the other indenyl ligand. More precisely, they are chiral, racemic bridged bisindenyl metallocene complexes. Whilst the complexes of the invention may be in their syn-configuration, ideally they are in their anti-configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the Figure below.

Racemic Anti          Racemic Syn

Formula (I) is intended to cover both syn- and anti-configurations, preferably anti. It is required in addition, that the group $R^{5'}$ is not hydrogen where the 5-position in the other ligand carries a hydrogen.

In fact, the metallocene complexes of use in the invention are $C_1$-symmetric but they maintain a pseudo-$C_2$-symmetry since they maintain $C_2$-symmetry in close proximity of the metal center, although not at the ligand periphery. The use of two different indenyl ligands as described in this invention allows for a much finer structural variation, hence a more precise tuning of the catalyst performance, compared to the typical $C_2$-symmetric catalysts. By nature of their chemistry, both anti and syn enantiomer pairs are formed during the synthesis of the complexes. However, by using the ligands of this invention, separation of the preferred anti isomers from the syn isomers is straightforward.

It is preferred if the metallocene complexes of the invention are employed as the rac anti isomer. Ideally therefore at least 95% mol, such as at least 98% mol, especially at least 99% mol of the metallocene catalyst is in the racemic anti isomeric form.

In the complex of use in the invention:

M is preferably Zr.

Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, $C_{1-20}$ alkyl, $C_{2-20}$ alkenyl, $C_{2-20}$ alkynyl, $C_{6-20}$ aryl, $C_{7-20}$ alkylaryl or $C_{7-20}$ arylalkyl radical; optionally containing heteroatoms belonging to groups 14-16. R is preferably a $C_{1-6}$ alkyl, phenyl or benzyl group.

Most preferably each X is independently a hydrogen atom, a halogen atom, $C_{1-6}$ alkoxy group or an R group, e.g. preferably a $C_{1-6}$ alkyl, phenyl or benzyl group. Most preferably X is chlorine or a methyl radical. Preferably both X groups are the same.

L is preferably an alkylene linker or a bridge comprising a heteroatom, such as silicon or germanium, e.g. —$SiR^8_2$—, wherein each $R^8$ is independently $C_{1-20}$ alkyl, $C_{3-10}$ cycloakyl, $C_{6-20}$ aryl or tri($C_{1-20}$ alkyl)silyl, such as trimethylsilyl. More preferably $R^8$ is $C_{1-6}$ alkyl, especially methyl or $C_{3-7}$ cycloalkyl, such as cyclohexyl. Most preferably, L is a dimethylsilyl or a methylcyclohexylsilyl bridge (i.e. Me-Si-cyclohexyl). It may also be an ethylene bridge.

$R^2$ and $R^{2'}$ can be different but they are preferably the same. $R^2$ and $R^{2'}$ are preferably a $C_{1-10}$ hydrocarbyl group such as $C_{1-6}$ hydrocarbyl group. More preferably it is a linear or branched $C_{1-10}$ alkyl group. More preferably it is a linear or branched $C_{1-6}$ alkyl group, especially linear $C_{1-6}$ alkyl group such as methyl or ethyl.

The $R^2$ and $R^{2'}$ groups can be interrupted by one or more heteroatoms, such as 1 or 2 heteroatoms, e.g. one heteroatom, selected from groups 14 to 16 of the periodic table. Such a heteroatom is preferably O, N or S, especially O. More preferably however the $R^2$ and $R^{2'}$ groups are free from heteroatoms. Most especially $R^2$ and $R^{2'}$ are methyl, especially both methyl.

The two Ar groups Ar and Ar' can be the same or different. The Ar' group may be unsubstituted. The Ar' is preferably a phenyl based group optionally substituted by groups $R^1$, especially an unsubstituted phenyl group.

The Ar group is preferably a $C_{6-20}$ aryl group such as a phenyl group or naphthyl group. Whilst the Ar group can be a heteroaryl group, such as carbazolyl, it is preferable that Ar is not a heteroaryl group. The Ar group can be unsubstituted or substituted by one or more groups $R^1$, more preferably by one or two $R^1$ groups, especially in position 4 of the aryl ring bound to the indenyl ligand or in the 3, 5-positions.

In one embodiment both Ar and Ar' are unsubstituted. In another embodiment Ar' is unsubstituted and Ar is substituted by one or two groups $R^1$.

$R^1$ is preferably a $C_{1-20}$ hydrocarbyl group, such as a $C_{1-20}$ alkyl group. $R^1$ groups can be the same or different, preferably the same. More preferably, $R^1$ is a $C_{2-10}$ alkyl group such as $C_{3-8}$ alkyl group. Highly preferred groups are tert butyl or isopropyl groups. It is preferred if the group $R^1$ is bulky, i.e. is branched. Branching might be alpha or beta to the ring. Branched $C_{3-8}$ alkyl groups are also favoured therefore.

In a further embodiment, two $R^1$ groups on adjacent carbon atoms taken together can form a fused 5 or 6 membered non aromatic ring with the Ar group, said ring being itself optionally substituted with one or more groups $R^4$. Such a ring might form a tetrahydroindenyl group with the Ar ring or a tetrahydronaphthyl group.

If an $R^4$ group is present, there is preferably only 1 such group. It is preferably a $C_{1-10}$ alkyl group.

It is preferred if there is one or two $R^1$ groups present on the Ar group. Where there is one $R^1$ group present, the group is preferably para to the indenyl ring (4-position). Where two $R^1$ groups are present these are preferably at the 3 and 5 positions.

$R^{5'}$ is preferably a $C_{1-20}$ hydrocarbyl group containing one or more heteroatoms from groups 14-16 and optionally substituted by one or more halo atoms or $R^{5'}$ is a $C_{1-10}$ alkyl group, such as methyl but most preferably it is a group $Z'R^{3'}$.

$R^6$ and $R^{6'}$ may be the same or different. In one preferred embodiment one of $R^6$ and $R^{6'}$ is hydrogen, especially $R^6$. It is preferred if $R^6$ and $R^{6'}$ are not both hydrogen. If not hydrogen, it is preferred if each $R^6$ and $R^{6'}$ is preferably a $C_{1-20}$ hydrocarbyl group, such as a $C_{1-20}$ alkyl group or $C_{6-10}$ aryl group. More preferably, $R^6$ and $R^{6'}$ are a $C_{2-10}$ alkyl group such as $C_{3-8}$ alkyl group. Highly preferred groups are tert-butyl groups. It is preferred if $R^6$ and $R^{6'}$ are bulky, i.e. are branched. Branching might be alpha or beta to the ring. Branched $C_{3-8}$ alkyl groups are also favoured therefore.

The $R^7$ and $R^{7'}$ groups can be the same or different. Each $R^7$ and $R^{7'}$ group is preferably hydrogen, a $C_{1-6}$ alkyl group or is a group $ZR^3$. It is preferred if $R^{7'}$ is hydrogen. It is preferred if $R^7$ is hydrogen, $C_{1-6}$ alkyl or $ZR^3$. The combination of both $R^7$ and $R^{7'}$ being hydrogen is most preferred. It is also preferred if $ZR^3$ represents $OC_{1-6}$ alkyl, such as methoxy. It is also preferred is $R^7$ represents $C_{1-6}$ alkyl such as methyl.

Z and Z' are O or S, preferably O.

$R^3$ is preferably a $C_{1-10}$ hydrocarbyl group, especially a $C_{1-10}$ alkyl group, or aryl group optionally substituted by one or more halo groups. Most especially $R^3$ is a $C_{1-6}$ alkyl group, such as a linear $C_{1-6}$ alkyl group, e.g. methyl or ethyl.

$R^{3'}$ is preferably a $C_{1-10}$ hydrocarbyl group, especially a $C_{1-10}$ alkyl group, or aryl group optionally substituted by one or more halo groups. Most especially $R^{3'}$ is a $C_{1-6}$ alkyl group, such as a linear $C_{1-6}$ alkyl group, e.g. methyl or ethyl or it is a phenyl based radical optionally substituted with one or more halo groups such as Ph or $C_6F_5$.

Thus, preferred complexes of the invention are of formula (II) or (II')

(II')

(II)

wherein
M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;
each $R^2$ or $R^{2'}$ is a $C_{1-10}$ alkyl group;
$R^{5'}$ is a $C_{1-10}$ alkyl group or $Z'R^{3'}$ group;
$R^6$ is hydrogen or a $C_{1-10}$ alkyl group;
$R^{6'}$ is a $C_{1-10}$ alkyl group or $C_{6-10}$ aryl group;
$R^7$ is hydrogen, a $C_{1-6}$ alkyl group or $ZR^3$ group;
$R^{7'}$ is hydrogen or a $C_{1-10}$ alkyl group;

Z and Z' are independently O or S;
$R^{3'}$ is a $C_{1-10}$ alkyl group, or a $C_{6-10}$ aryl group optionally substituted by one or more halo groups;
$R^3$ is a $CO_{1-10}$-alkyl group;
Each n is independently 0 to 4, e.g. 0, 1 or 2;
and each $R^1$ is independently a $C_{1-20}$ hydrocarbyl group, e.g. $C_{1-10}$ alkyl group.

Further preferred complexes of the invention are those of formula (III) or (III'):

(III')

(III)

wherein
M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;
L is a divalent bridge selected from —R'$_2$C— or —R'$_2$Si— wherein each R' is independently a hydrogen atom, $C_{1-20}$ alkyl or $C_{3-10}$ cycloalkyl;
$R^6$ is hydrogen or a $C_{1-10}$ alkyl group;
$R^{6'}$ is a $C_{1-10}$ alkyl group or $C_{6-10}$ aryl group;
$R^7$ is hydrogen, $C_{1-6}$ alkyl or $OC_{1-6}$ alkyl;
Z' is O or S;
$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Further preferred complexes of use in the invention are those of formula (IV) or (IV'):

(IV')

(IV)

wherein

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most especially, the complex of use in the invention is of formula (V) or (V'):

(V')

(V)

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group;

$R^{3'}$ is a $C_{1-6}$ alkyl group, or $C_{6-10}$ aryl group optionally substituted by one or more halo groups; and n is independently 0, 1 or 2.

Particular compounds of the invention include: rac-anti-Me₂Si(2-Me-4-Ph-6-tBu-Ind)(2-Me-4-Ph-5-OMe-6-tBu-Ind)ZrCl₂, rac-anti-Me₂Si(2-Me-4-(p-tBuPh)-Ind)(2-Me-4-Ph-5-OMe-6-tBu-Ind)ZrCl₂, rac-anti-Me₂Si(2-Me-4-(3,5-di-tBuPh)-6-tBu-Ind)(2-Me-4-Ph-5-OMe-6-tBu-Ind)ZrCl₂, rac-anti-Me₂Si(2-Me-4-Ph-6-tBu-Ind)(2-Me-4,6-di-Ph-5-OMe-Ind)ZrCl₂, rac-anti-Me₂Si(2-Me-4-(p-tBuPh)-Ind)(2-Me-4-Ph-5-OC₆F₅)-6-iPr-Ind)ZrCl₂, rac-anti-Me(CyHex)Si(2-Me-4-Ph-6-tBu-Ind)(2-Me-4-Ph-5-OMe-6-tBu-Ind)ZrCl₂, rac-anti-Me₂Si(2-Me-4-(3,5-di-tBuPh)-7-Me-Ind)(2-Me-4-Ph-5-OMe-6-tBu-Ind)ZrCl₂, rac-anti-Me₂Si(2-Me-4-(3,5-di-tBuPh)-7-OMe-Ind)(2-Me-4-Ph-5-OMe-6-tBu-Ind)ZrCl₂, rac-anti-Me₂Si(2-Me-4-(p-tBuPh)-6-tBu-Ind)(2-Me-4-Ph-5-OMe-6-tBu-Ind)ZrCl₂, rac-anti-Me₂Si(2-Me-4-(p- tBuPh)-Ind)(2-Me-4-(4-tBuPh)-5-OMe-6-tBu-Ind)ZrCl$_2$, rac-anti-Me$_2$Si(2-Me-4-(p-tBuPh)-Ind)(2-Me-4-(3,5-tBu2Ph)-5-OMe-6-tBu-Ind)ZrCl$_2$, and rac-anti-Me$_2$Si(2-Me-4-(p-tBuPh)-Ind)(2-Me-4-Ph-5-OiBu-6-tBu-u-Ind)ZrCl$_2$.

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

In one especially preferred embodiment the complex is rac-anti-Me$_2$Si(2-Me-4-(p-tBuPh)-Ind)(2-Me-4-Ph-5-OMe-6-tBu-Ind)ZrCl$_2$.

Concerning the synthesis of the complex according to this invention it is also referred to WO 2013/007650 A1.

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention.

Thus the catalyst according to this invention comprises (i) a complex as defined above and (ii) a cocatalyst, like an aluminium alkyl compound (or other appropriate cocatalyst), or the reaction product thereof. Thus the cocatalyst is preferably an alumoxane, like MAO or an alumoxane other than MAO.

Borate cocatalysts can also be employed. It will be appreciated by the skilled man that where boron based cocatalysts are employed, it is normal to preactivate the complex by reaction thereof with an aluminium alkyl compound, such as TIBA. This procedure is well known and any suitable aluminium alkyl, e.g. Al(C$_{1-6}$-alkyl)$_3$, can be used.

Boron based cocatalysts of interest include those of formula $$BY_3$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are trifluoromethyl, p-fluorophenyl, 3,5-difluorophenyl, pentafluorophenyl, 3,4,5-trifluorophenyl and 3,5-di(trifluoromethyl)phenyl. Preferred options are trifluoroborane, tris(4-fluorophenyl)borane, tris (3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris (3,4,5-trifluorophenyl)borane.

Particular preference is given to tris(pentafluorophenyl) borane.

It is preferred however is borates are used, i.e. compounds of general formula [C]$^+$[BX4]$^-$. Such ionic cocatalysts contain a non-coordinating anion [BX4]$^-$ such as tetrakis(pentafluorophenyl)borate. Suitable counterions [C]$^+$ are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: tributylammoniumtetrakis (pentafluorophenyl)borate, tributylammoniumtetrakis(trifluoromethylphenyl)borate, tributylammoniumtetrakis(4-fluorophenyl)borate, N,N-dimethylcyclohexylammoniumtetrakis(pentafluorophenyl) borate, N,N-dimethylbenzylammoniumtetrakis (pentafluorophenyl)borate, N,N-dimethylaniliniumtetrakis (pentafluorophenyl)borate, N,N-di(propyl) ammoniumtetrakis(pentafluorophenyl)borate, di(cyclohexyl)ammoniumtetrakist(pentafluorophenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

The use of B(C$_6$F$_5$)$_3$, C$_6$H$_5$N(CH$_3$)$_2$H:B(C$_6$F$_5$)$_4$, (C$_6$H$_5$)$_3$C:B(C$_6$F$_5$)$_4$ is especially preferred.

The metallocene complex used in the present invention can be used in combination with a suitable cocatalyst as a catalyst e.g. in a solvent such as toluene or an aliphatic hydrocarbon, (i.e. for polymerization in solution), as it is well known in the art.

The catalyst used in the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856 (Mobil), WO95/12622 (Borealis) and WO2006/097497. The particle size is not critical but is preferably in the range 5 to 200 µm, more preferably 20 to 80 µm. The use of these supports is routine in the art.

In preferred embodiment, no support is used at all. Such a catalyst can be prepared in solution, for example in an aromatic solvent like toluene, by contacting the metallocene (as a solid or as a solution) with the cocatalyst, for example methylaluminoxane or a borane or a borate salt, or can be prepared by sequentially adding the catalyst components to the polymerization medium. In a preferred embodiment, the metallocene (when X differs from alkyl or hydrogen) is prereacted with an aluminum alkyl, in a ratio metal/aluminum of from 1:1 up to 1:500, preferably from 1:1 up to 1:250, and then combined with the borane or borate cocatalyst, either in a separate vessel or directly into the polymerization reactor. Preferred metal/boron ratios are between 1:1 and 1:100, more preferably 1:1 to 1:10.

In one particularly preferred embodiment, no external carrier is used but the catalyst is still presented in solid particulate form. Thus, no external support material such as inert organic or inorganic carrier, such as for example silica, as described above, is employed.

In order to provide the catalyst used in the invention in solid form but without using an external carrier, it is preferred if a liquid/liquid emulsion system is used. The process involves forming dispersing catalyst components (i) and (ii), i.e. the complex and the cocatalyst, in a solvent, and solidifying said dispersed droplets to form solid particles.

Reference is made to WO2006/069733 describing principles of such a continuous or semicontinuous preparation methods of the solid catalyst types, prepared via emulsion/solidification method. For further details it is also referred to WO 2013/007650 A1.

It should be noted that present invention is preferably directed to fiber reinforced compositions in which the polymer phase forms a continuous phase being the matrix for the fibers. Hence, the polymer forming the matrix for the fibers in the composition is preferably monophasic. In case of this preferred embodiment, the polymer matrix does not contain elastomeric (co)polymers forming inclusions as a second phase for improving mechanical properties of the composite, such as elongation at break. A polymer phase containing elastomeric (co)polymers as insertions of a second phase would by contrast be called heterophasic and is not part of this preferred embodiment.

The desired mechanical properties of the fiber reinforced composite are hence preferably controlled by the polypropylene random copolymer comprising ethylene and/or $C_4$ to $C_8$ α-olefin (PP-RACO) in combination with the adhesion promoter (AP) improving the adhesion an insertion of the fibers. It is believed that the polymer of such composite forms a continuous phase. Further insertions of second or more elastomer phases aiming to improve the same mechanical properties are preferably excluded.

Glass Fiber (GF)

The second essential component of the present fiber reinforced composition are the glass fibers (GF). Preferably the glass fibers are cut glass fibers, also known as short fibers or chopped strands.

The cut or short glass fibers used in the fiber reinforced composition preferably have an average length of from 1 to 10 mm, more preferably from 1 to 7 mm, for example 3 to 5 mm, or 4 mm. The cut or short glass fibers used in the fiber reinforced composition preferably have an average diameter of from 8 to 20 μm, more preferably from 9 to 16 μm, for example 10 to 15 μm.

Preferably, the fibers (GF) have an aspect ratio of 125 to 650, preferably of 150 to 450, more preferably 200 to 400, still more preferably 250 to 350. The aspect ratio is the relation between average length and average diameter of the fibers.

Adhesion Promoter (AP)

The fiber reinforced composition also comprises an adhesion promoter (AP).

The adhesion promoter (AP) preferably comprises a modified (functionalized) polypropylene. Modified polypropylenes, in particular propylene homopolymers and copolymers, like copolymers of propylene with ethylene or with other α-olefins, are most preferred, as they are highly compatible with the polymers of the fiber reinforced composition.

In terms of structure, the modified polypropylenes are preferably selected from graft or block copolymers.

In this context, preference is given to modified polypropylenes containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

Particular preference is given to using a polypropylene grafted with maleic anhydride as the modified polypropylene, i.e. as the adhesion promoter (AP).

The modified polypropylene, i.e. the adhesion promoter (AP), can be produced in a simple manner by reactive extrusion of the polymer, for example with maleic anhydride in the presence of free radical generators (like organic peroxides), as disclosed for instance in EP 0 572 028.

The amounts of groups deriving from polar compounds in the modified polypropylene, i.e. the adhesion promoter (AP), are from 0.5 to 5.0 wt. %, preferably from 0.5 to 4.0 wt. %, and more preferably from 0.5 to 3.0 wt. %.

Preferred values of the melt flow rate $MFR_2$ (230° C.) for the modified polypropylene, i.e. for the adhesion promoter (AP), are from 1.0 to 500 g/10 min.

Fiber Reinforced Composition

In addition to the above described components, the instant composition may additionally contain typical other additives useful for instance in the automobile sector, like carbon black, other pigments, antioxidants, UV stabilizers, nucleating agents, antistatic agents and slip agents, in amounts usual in the art.

Thus a further embodiment of present invention is a fiber reinforced composition consisting of (a) 50 to 84.5 wt. %, preferably 60 to 80 wt. %, and more preferably 65 to 77 wt. %, of the polypropylene random copolymer comprising ethylene and/or $C_4$ to $C_8$ α-olefin (PP-RACO), (b) 15 to 45 wt. %, preferably 18 to 35 wt. %, and more preferably 20 to 30 wt. % of glass fibers (GF) and (c) 0.5 to 5.0 wt.-% of a modified polypropylene as adhesion promoter (AP), preferably 1.0 to 4.0 wt.-% and more preferably 1.0 to 3.0 wt.-%, (d) 0.0 to 3.0 wt.-% of a masterbatch, and (e) 0.0 to 3.0 wt.-% of one or more additives, based on the total weight of the fiber reinforced composition, wherein (i) the polypropylene random copolymer comprising ethylene and/or $C_4$ to $C_8$ α-olefin (PP-RACO) heaving a melt flow rate $MFR_2$ (230° C.) measured according to ISO 1133 of at least 2.5 g/10 min, (ii) the glass fibers (GF) are cut glass fibers, (iii) the complete polymer contained in the reinforced composition forms a continuous phase being the matrix of the fiber reinforced composition It is to be understood that all the combinations as described above are applicable for these embodiments as well.

Additives in this meaning are for example carbon black, other pigments, antioxidants, UV stabilizers, nucleating agents, antistatic agents and slip agents.

The term masterbatch means polymer-bound additives, for instance color and additive concentrates physically or chemically bound onto or into polymers. It is appreciated that such masterbatches contain as less polymer as possible.

The additives as stated above are added to the polypropylene random copolymer (PP-RACO), which is collected from the final reactor of the polymer production process. Preferably, these additives are mixed into the polypropylene random copolymer (PP-RACO) or during the extrusion process in a one-step compounding process. Alternatively, a master batch may be formulated, wherein the polypropylene random copolymer (PP-RACO) is first mixed with only some of the additives.

The properties of the polypropylene random copolymer comprising ethylene and/or $C_4$ to $C_8$ α-olefin (PP-RACO), produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

For mixing the individual components of the instant fiber reinforced composition, a conventional compounding or blending apparatus, e.g. a Banbury mixer, a 2-roll rubber mill, Buss-co-kneader or a twin screw extruder may be used. Preferably, mixing is accomplished in a co-rotating twin screw extruder. The polymer materials recovered from the extruder are usually in the form of pellets. These pellets are then preferably further processed, e.g. by injection molding to generate articles and products of the inventive fiber reinforced composition.

The fiber reinforced composite according to the invention has the following properties:

The overall melt flow rate $MFR_2$ (230° C.), i.e. the melt flow rate of the fiber reinforced composite is at least 1.0 g/10 min, preferably at least 1.5 g/10 min. The upper limit of the $MFR_2$ (230° C.) is 15.0 g/10 min, preferably 10.0 g/10 min and more preferably 7.0 g/10 min.

The overall tensile modulus, i.e. the tensile modulus measured at 23° C. according to ISO 527-2 (cross head speed 1 mm/min) of the fiber reinforced composite, is at least 2,500 MPa, preferably at least 3,000 MPa and more preferably at least 3,500 MPa.

The upper limit of the tensile modulus of the fiber reinforced composite may be 10,000 MPa, preferably 9,000 MPa, and more preferably in the range of 8,000 MPa.

The tensile strain at break measured at 23° C. according to ISO 527-2 (cross head speed 50 mm/min) is at least 4.0%, preferably at least 4.5% and more preferably at least 4.8%.

The tensile stress at break measured at 23° C. according to ISO 527-2 (cross head speed 50 mm/min) is at least 50 MPa, preferably at least 60 MPa and more preferably at least 65 MPa.

A value for the total emission of volatiles measured according to VDA 277:1995 of equal or below 10 ppm, preferably equal or below 5 ppm and more preferably equal or below 4 ppm.

A VOC value measured according to VDA 278:2002 of equal or below 50 ppm, preferably equal or below 40 ppm and more preferably equal or below 35 ppm.

VOC is the amount of volatile organic compounds (VOC) [in ppm].

A FOG value measured according to VDA 278:2002 of equal or below 130 ppm, preferably equal or below 110 ppm and more preferably equal or below 100 ppm.

FOG is the amount of fogging compounds (FOG) [in ppm].

A Charpy notched impact strength at 23° C. ISO 179-1eA:2000 of at least 5.0 kJ/m$^2$, preferably in the range of 6.5 to 15 kJ/m$^2$ and more preferably in the range of 7.0 to 12 kJ/m$^2$.

A Charpy impact strength at 23° C. ISO 179-1eU:2000 of at least 8.0 kJ/m$^2$, preferably in the range of 9.0 to 18 kJ/m$^2$ and more preferably in the range of 10.0 to 16.0 kJ/m$^2$.

A heat distortion temperature (HDT) determined according to ISO 75-2 Method A (load 1.80 MPa surface stress) in the range of 95° C. to 145° C., preferably in the range of 100° C. to 135° C. and more preferably in the range of 105° C. to 130° C.

Thus, the fiber reinforced polypropylene composites show an excellent impact/stiffness balance and have very low emissions.

The fiber reinforced composition according to the invention may be pelletized and compounded using any of the variety of compounding and blending methods well known and commonly used in the resin compounding art.

The composition of the present fiber reinforced composition can be used for the production of molded articles, preferably injection molded articles as well as foamed articles. Even more preferred is the use for the production of parts of washing machines or dishwashers as well as automotive articles, especially of car interiors and exteriors, like instrumental carriers, shrouds, structural carriers, bumpers, side trims, step assists, body panels, spoilers, dashboards, interior trims and the like.

According to a preferred embodiment, the article is a foamed article comprising the fiber reinforced composition described above.

Appropriate preparation methods of foamed articles, either by chemical or physical foaming, are commonly known to the skilled person.

The present invention further relates to automotive articles comprising the fiber reinforced composition as defined above.

In addition, the present invention also relates to a process for the preparation of the fiber reinforced composition as described above, comprising the steps of adding (a) polypropylene random copolymer (PP-RACO), (b) the glass fibers (GF), and (c) the modified polypropylene as adhesion promoter (AP)

to an extruder and extruding the same obtaining said fiber reinforced composition.

EXPERIMENTAL PART

1. Methods $MFR_2$ (230° C.) is measured according to ISO 1133 (230° C., 2.16 kg load).

Quantification of Copolymer Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra.

Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

The Xylene Solubles (XCS, Wt.-%):

Content of xylene cold solubles (XCS) is determined at 25° C. according ISO 16152; first edition; 2005.

DSC Analysis, Melting Temperature ($T_m$) measured with a TA Instrument Q200-differential scanning calorimetry (DSC) on 5 to 7 mg samples. DSC is run according to ISO 11357/part 3/method $C_2$ (1999) in a heat/cool/heat cycle with a scan rate of 10° C./min in the temperature range of −30 to +225° C. The melting temperature is determined from the second heating step.

Size Exclusion Chromatography (SEC):

Number average molecular weight (Mn), weight average molecular weight (Mw) and polydispersity (Mw/Mn) are determined by size exclusion chromatography (SEC) using Waters Alliance GPCV 2000 instrument with online viscometer. The oven temperature is 140° C. Trichlorobenzene is used as a solvent (ISO 16014: 2003).

Tensile Tests:

The tensile modulus, the tensile strain at break and the tensile stress at break were measured at 23° C. according to ISO 527-2 (cross head speed 1 mm/min for tensile modulus, 50 mm/min for others) using injection moulded specimens moulded at 230° C. according to ISO 527-2(1B), produced according to EN ISO 1873-2 (dog 10 bone shape, 4 mm thickness).

Charpy Impact Test:

The Charpy impact strength (IS) was measured according to ISO 179-1eU: 2000 at +23° C. and the Charpy notched impact strength (NIS) was measured according to ISO 179-1eA:2000 at +23° C., using injection-molded bar test specimens of 80×10×4 mm$^3$ prepared in accordance with ISO 1873-2:2007.

Heat Distortion Temperature (HDT) was determined according to ISO 75-2 Method A (1.80 MPa surface stress) using injection molded test specimens of 80×10×4 mm$^3$ produced as described in EN ISO 1873-2 (80×10×4 mm).

Total Emissions of Volatiles

The total emission of the polymers was determined by using multiple head space extraction according to VDA 277:1995 using a gas chromatograph and a headspace method. The equipment was a Hewlett Packard gas chromatograph with a WCOT-capillary column (wax type) of 30 m length and 0.25 mm×2.5 µm inner diameter (0.25 µm film thickness). A flame ionisation detector was used with hydrogen as a fuel gas.

The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and average carrier-speed 22-27 cm/s.

The emission potential was measured on the basis of the sum of all values provided by the emitted substances after gas chromatography analysis and flame ionization detection with acetone as the calibration standard. Sample introduction (pellets, about 1 gram) was by headspace analysis (10 ml head space vial) after conditioning at 120° C. for 5 hours prior to the measurement.

The unit is µgC/g (µg carbon per g of sample), respectively ppm.

VOC/FOG Emission

The VOC/FOG emission was measured according to VDA 278:2002 on the granulated compounds. The volatile organic compounds are measured in toluene equivalents per gram sample (µgTE/g). The fogging is measured in hexadecane equivalents per gram sample (µgHD/g).

The measurements were carried out with a TDSA supplied by Gerstel using helium 5.0 as carrier gas and a column HP Ultra 2 of 50 m length and 0.32 mm diameter and 0.52 µm coating of 5% Phenyl-Methyl-Siloxane.

The VOC-Analysis was done according to device setting 1 listed in the standard using following main parameters: flow mode splitless, final temperature 90° C.; final time 30 min, rate 60K/min. The cooling trap was purged with a flow-mode split 1:30 in a temperature range from −150° C. to +280° C. with a heating rate of 12 K/sec and a final time of 5 min. The following GC settings were used for analysis: 2 min isothermal at 40° C. heating at 3 K/min up to 92° C., then at 5 K/min up to 160° C., and then at 10 K/min up to 280° C., 10 minutes isothermal; flow 1.3 ml/min.

The VOC amounts account for $C_{10}$ to $C_{16}$ species.

The FOG analysis was done according to device setting 1 listed in the standard using following main parameters: flow-mode splitless, rate 60K/min; final temperature 120° C.; final time 60 min. The cooling trap was purged with a flow-mode split 1:30 in a temperature range from −150° C. to +280° C. with a heating rate of 12 K/sec. The following GC-settings were used for analysis: isothermal at 50° C. for 2 min, heating at 25 K/min up to 160° C., then at 10 K/min up to 280° C., 30 minutes isothermal; flow 1.3 ml/min.

The FOG amounts account for $C_{1-6}$ to $C_{30}$ species.

EXAMPLES

Catalyst Preparation:

The catalyst used in the Inventive Examples IE1 to IE4 has been prepared following the procedure described in WO 2013/007650 A1 for catalyst E2, by adjusting the metallocene and MAO amounts in order to achieve the Al/Zr ratios indicated in table 1. The catalyst has been off-line prepolymerized with propylene, following the procedure described in WO 2013/007650 A1 for catalyst E2P.

The complex used was rac-anti-Me$_2$Si(2-Me-4-(p-tBuPh)-Ind)(2-Me-4-Ph-5-OMe-6-tBu-Ind)ZrCl$_2$.

Degree of off-line pre-polymerization 3.3 g/g
Al/Zr molar ratio in catalyst 431 mol/mol
Metallocene complex content of off-line prepolymerized catalyst 0.696 wt. %

The same catalyst was used for preparing the polymer of Comparative Examples CE1 and CE2.

For Comparative Examples CE3 and CE4 commercially available base polymers based on ZN catalysts have been used.

For Comparative Example CE5 the catalyst used in the polymerization process of the base polymer for CE5 has been produced as follows: First, 0.1 mol of MgCl$_2$×3 EtOH was suspended under inert conditions in 250 ml of decane in a reactor at atmospheric pressure.

The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As cocatalyst triethyl-aluminium (TEAL) and as donor dicyclo pentyl dimethoxy silane (D-donor) was used. The aluminium to donor ratio was 5 mol/mol. Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307.

Preparation of Base Polymer (PP-RACO)

The base polymers for IE1 to IE 4 and the base polymer of CE1 and CE2 have been prepared in a Borstar® PP pilot plant with a prepolymerization reactor, a loop reactor and 2 gas phase reactors (GPR1 and GPR2) connected in series.

TABLE 1

Preparation of base polymers for IE1 to IE 4 and for CE1 and CE2
The base polymers (BP1) for IE1 and IE 2 are the same, the
base polymers for IE3 and IE4 (BP2) are the same and the
base polymers for CE1 and CE2 (BP3) are the same

|  | unit | IE1/IE2 (BP1) | IE3/IE4 (BP2) | CE1/CE2 (BP3) |
| --- | --- | --- | --- | --- |
| Prepolymerization |  |  |  |  |
| Amount of cat | g/kg C$_3$ | 0.079 | 0.085 | 0.110 |
| Temperature | ° C. | 20 | 20 | 20 |
| Residence time | h | 0.45 | 0.43 | 0.47 |
| Loop |  |  |  |  |
| Temperature | ° C. | 80 | 80 | 80 |
| Split | % | 49 | 43 | 46 |
| H$_2$/C$_3$ ratio | mol/kmol | 0.26 | 0.18 | 0.31 |
| C$_2$ content | % | 0 | 0 | 0 |
| MFR$_2$ | g/10 min | 6.3 | 3.3 | 8.2 |
| XS | % | 0.9 | 0.8 | 1.8 |
| GPR1 |  |  |  |  |
| Temperature | ° C. | 80 | 80 | 80 |
| Split | % | 51 | 49 | 54 |
| Pressure | kPa | 1800 | 2109 | 3000 |

TABLE 1-continued

Preparation of base polymers for IE1 to IE 4 and for CE1 and CE2
The base polymers (BP1) for IE1 and IE 2 are the same, the
base polymers for IE3 and IE4 (BP2) are the same and the
base polymers for CE1 and CE2 (BP3) are the same

|  | unit | IE1/IE2 (BP1) | IE3/IE4 (BP2) | CE1/CE2 (BP3) |
| --- | --- | --- | --- | --- |
| H$_2$/C$_3$ ratio | mol/kmol | 6.21 | 8.19 | 1.96 |
| C$_2$ content | % | 2.8 | 1.7 | 0 |
| MFR$_2$ | g/10 min | 9.0 | 10.0 | 8.0 |
| XS | % | 13.2 | 3.2 | 1.3 |
| GPR2 |  |  |  |  |
| Temperature | ° C. | n.a. | 75 | n.a |
| Split | % | n.a. | 8 | n.a. |
| Pressure | kPa | n.a. | 2600 | n.a. |
| H$_2$/C$_3$ ratio | Mol/kmol | n.a. | 5.03 | n.a. |
| C$_2$/C$_3$ ratio | Mol/kmol | n.a. | 10000 | n.a. |
| Final product |  |  |  |  |
| MFR$_2$ | g/10 min | 8.2 | 7.4 | 9.0 |
| XS | % | 11.6 | 12.9 | 1.3 |
| C$_2$ content | % | 2.6 | 8.7 | 0 |
| Mw (SEC) | kg/mol | 220 | 230 | 202 |
| Mw/Mn (SEC) | — | 4.2 | 5.1 | 3.2 | n.a. . . . not applicaple, since not used

Base polymer (BP4) for CE3 is a mixture of 79.2 wt. % of HF700SA, being a PP homopolymer commercially available from Borealis AG, Austria, having an MFR (230° C./2.16 kg) of 21 g/10 min, a density of 905 kg/m$^3$ and a melting point (DSC) of 165° C. and 20.8 wt. % of BE50, being a PP homopolymer commercially available from Borealis AG, Austria, having an MFR (230° C./2.16 kg) of 0.3 g/10 min, a density of 905 kg/m$^3$ and a melting point (DSC) of 165° C.

Base polymer (BP5) for CE4 is a mixture of of 79.1 wt. % of HF700SA, being a PP homopolymer commercially available from Borealis AG, Austria, having an MFR (230° C./2.16 kg) of 21 g/10 min, a density of 905 kg/m$^3$ and a melting point (DSC) of 165° C. and 20.9 wt. % of BE50, being a PP homopolymer commercially available from Borealis AG, Austria, having an MFR (230° C./2.16 kg) of 0.3 g/10 min, a density of 905 kg/m$^3$ and a melting point (DSC) of 165° C.

Polymerization Conditions for Base Polymer (BP6) for CE5

|  | unit | Base polymer CE5 |
| --- | --- | --- |
| Prepolymerization |  |  |
| Temperature | ° C. | 25 |
| pressure | bar | 52 |
| Residence time | h | 0.35 |
| C$_2$ content | wt. % | 0 |
| Loop |  |  |
| Temperature | ° C. | 65 |
| pressure | bar | 55 |
| Residence time | h | 0.38 |
| MFR$_2$ | g/10 min | 19 |
| C$_2$ content | wt. % | 1.35 |
| XCS | wt. % | 2.4 |
| GPR |  |  |
| Temperature | ° C. | 80 |
| pressure | bar | 23 |
| Residence time | h | 1.1 |
| MFR$_2$ | g/10 min | 14 |

-continued

| | unit | Base polymer CE5 |
|---|---|---|
| $C_2$ content | wt.-% | 1.8 |
| XCS | wt.-% | 2.3 |
| Split Loop/GPR | % | 56/44 |

Base polymer (BP7) for CE6 is the commercial polypropylene random copolymer (PP-RACO) "RF366MO" of Borealis AG with an $MFR_2$ of 20 g/10 min, a melting temperature of 151° C., an ethylene content of 3.3 wt.-%, a XCS content of 6.0 wt. %, a density of 905 kg/m³, and a tensile modulus of 1,200 MPa;

Preparation of Blends

The following inventive examples IE1 to IE4 and comparative examples CE1 to CE6 were prepared by compounding on a co-rotating twin-screw extruder with a screw configuration typical for glass fiber mixing using a temperature range between 200 and 240° C.

Compound Recipe of the Compositions

| Component | IE1 | IE2 | IE3 | IE4 | CE1 | CE2 | CE3 | CE4 | CE5 | CE6 |
|---|---|---|---|---|---|---|---|---|---|---|
| BP1 [wt. %] | 78.45 | 68.45 | | | | | | | | |
| BP2 [wt. %] | | | 78.45 | 68.45 | | | | | | |
| BP3 [wt. %] | | | | | 78.45 | 68.45 | | | | |
| BP4 [wt. %] | | | | | | | 78.45 | | | |
| BP5 [wt. %] | | | | | | | | 68.45 | | |
| BP6 [wt. %] | | | | | | | | | 62.5 | |
| BP7 [wt. %] | | | | | | | | | | 62.5 |
| AP-1 [wt. %] | 1 | 1 | 1 | 1 | 1 | 1 | 1 | 1 | | |
| AP-2 [wt. %] | | | | | | | | | 1.5 | 1.5 |
| DSTDP | 0.25 | 0.25 | 0.25 | 0.25 | 0.25 | 0.25 | 0.25 | 0.25 | | |
| AO3 | 0.2 | 0.2 | 0.2 | 0.2 | 0.2 | 0.2 | 0.2 | 0.2 | | |
| P168 | 0.1 | 0.1 | 0.1 | 0.1 | 0.1 | 0.1 | 0.1 | 0.1 | | |
| MB-1 | | | | | | | | | 2.0 | 2.0 |
| GF | 20 | 30 | 20 | 30 | 20 | 30 | 20 | 30 | 32 | 32 |

AP-1 is the commercial maleic anhydride functionalized polypropylene "Exxelor PO1020" of Exxon Mobil with a density 0.9 g/cm³, an $MFR_2$ of 430 g/10 min and an MAH content of 1.0 mol.-%;
AP-2 is the commercial maleic anhydride functionalized polypropylene "Scona TPPP 2112FA" of Kometra GmbH, Germany with a density of 0.9 g/cm³, having an $MFR_2$ of 5 g/10 min and an MAH content of 1.2 mol.-%.
DSTDP is the heat stabilizer Di-stearyl-thio-di-propionate (CAS No. 693-36-7) commercially available as Irganox PS-802 FL from BASF AG, Germany
AO3 is the primary antioxidant Bis-(3,3-bis-(4-'-hydroxy-3'-tert. butylphenyl)butanic acid)-glycolester (CAS No. 32509-66-3) commercially available as Hostanox O3 from Clariant SE, Switzerland
P168 is the secondary antioxidant Tris (2,4-di-t-butylphenyl) phosphite (CAS No. 31570-04-4) commercially available as Irgafos 168 from BASF AG, Germany
MB-1 is the commercial carbon black masterbatch "Plasblak PE4103" of Cabot Corporation, Germany
GF are the commercial glass fibers "Thermo Flow ® Chopped Strand 636 for PP" of Johns Manville, which are E-glass fibers coated with a silane based sizing, a length of 4 mm, and an average diameter of 13 μm The compositions have the following properties

| Parameter | unit | IE1 | IE2 | IE3 | IE4 | CE1 | CE2 | CE3 | CE4 | CE5 | CE6 |
|---|---|---|---|---|---|---|---|---|---|---|---|
| $MFR_2$ | g/10 min | 4 | 3 | 3 | 2 | 4 | 3 | 3 | 2 | 4.2 | 6.2 |
| CV | ppm | 3 | 2 | 1 | 1 | 7 | 6 | 30 | 23 | 33 | 35 |
| VOC | ppm | 28 | 25 | 33 | 25 | 44 | 43 | 104 | 93 | 122 | 134 |
| FOG | ppm | 74 | 74 | 95 | 93 | 138 | 147 | 254 | 239 | 266 | 287 |
| TM | MPa | 3807 | 5486 | 3958 | 5756 | 4767 | 6814 | 5087 | 6982 | 7060 | 6158 |
| Bstress | MPa | 66 | 82 | 66 | 83 | 82 | 102 | 85 | 104 | 108 | 95 |
| Bstrain | % | 5.59 | 5.26 | 5.05 | 4.93 | 3.9 | 3.7 | 3.58 | 3.36 | 3.4 | 4.2 |
| IS | kJ/m² | 11.48 | 14.8 | 12.6 | 15.2 | 9.7 | 12.2 | 9.2 | 11.6 | n.d | n.d |
| NIS | kJ/m² | 7.2 | 9.3 | 8.5 | 10.4 | 7.5 | 9.6 | 7.4 | 9.6 | 9.4 | 9.4 |
| HDT | ° C. | 105 | 116 | 112 | 120 | 132 | 137 | 137 | 144 | 138 | 134 |

CV . . . content volatile
TM . . . tensile modulus
Bstress . . . tensile stress at break
Bstrain . . . tensile strain at break
IS . . . Charpy impact strength (ISO 179-1eU) at 23° C.
NIS . . . Charpy notched impact strength (ISO 179-1eA) at 23° C.
HDT . . . Heat deflection temperature
n.d.—not determined As can be seen from FIGS. 1 and 2 the compositions of the Inventive Examples show much better impact/stiffness balance as the compositions of the Comparative Examples CE1 to CE4.

Additionally the compositions of the Inventive Examples have clearly lower emissions.

The invention claimed is:

1. A fiber reinforced composition comprising
   (a) 50.0 to 84.5 wt. % of a metallocene catalyzed polypropylene random copolymer comprising ethylene and/or $C_4$ to $C_8$ α-olefin (PP-RACO),
   (b) 15.0 to 45.0 wt. % glass fibers (GF) and
   (c) 0.5 to 5.0 wt. % a modified polypropylene as adhesion promoter (AP), based on the total weight of the fiber reinforced composition,
   wherein
   (i) the polypropylene random copolymer comprising 1.0 to 10.0 wt. % of ethylene and/or $C_4$ to $C_8$ α-olefin (PP-RACO) having a melt flow rate $MFR_2$ (230° C.) measured according to ISO 1133 of at least 2.5 g/10 min up to 15.0 g/10 min, having a xylene cold soluble content (XCS) measured according ISO 16152 (25° C.)

in the range of 10 to 25 wt. %, and having a polydispersity (Mw/Mn) as determined by size exclusion chromatography in the range of 1.5 to 6.5, (ii) the glass fibers (GF) are cut glass fibers and (iii) the complete polymer contained in the reinforced composition forms a monophasic continuous phase being the matrix of the fiber reinforced composition.

2. The fiber reinforced composition according to claim 1, wherein the adhesion promoter (AP) is a polypropylene homo- or copolymer with grafted polar groups.

3. The fiber reinforced composition according to claim 1, wherein the overall tensile modulus measured at 23° C. according to ISO 527-2, measured at a cross head speed of 1 mm/min, is at least 2,500 MPa.

4. The fiber reinforced composition according to claim 1, wherein the tensile strain at break measured at 23° C. according to ISO 527-2, measured at a cross head speed of 50 mm/min, is at least 4.0%.

5. The fiber reinforced composition according to claim 1, wherein the amount of volatile organic compounds (VOC) measured according to VDA 278:2002 is equal to or below 50 ppm.

6. The fiber reinforced composition according to claim 1, wherein the amount of fogging compounds (FOG) measured according to VDA 278:2002 is equal to or below 130 ppm.

7. The fiber reinforced composition according to claim 1, wherein the polypropylene random copolymer (PP-RACO) is prepared by polymerizing propylene and ethylene and/or $C_{4-8}$ α-olefin in the presence of a catalyst, the catalyst comprising an asymmetrical complex of formula (I)

(I)

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, and —R'$_2$Ge—, wherein each R' is independently a hydrogen atom, $C_{1-20}$-hydrocarbyl, tri($C_{1-20}$-alkyl)silyl, $C_{6-20}$-aryl, $C_{7-20}$-arylalkyl or $C_{7-20}$-alkylaryl;
$R^2$ and $R^{2'}$ are each independently a $C_{1-20}$ hydrocarbyl radical optionally containing one or more heteroatoms from groups 14-16;
$R^{5'}$ is a $C_{1-20}$ hydrocarbyl group optionally containing one or more heteroatoms from groups 14-16 and optionally substituted by one or more halo atoms;
$R^6$ and $R^{6'}$ are each independently hydrogen or a $C_{1-20}$ hydrocarbyl group optionally containing one or more heteroatoms from groups 14-16;
$R^7$ and $R^{7'}$ are each independently hydrogen or $C_{1-20}$ hydrocarbyl group optionally containing one or more heteroatoms from groups 14-16;

Ar is an aryl or heteroaryl group having up to 20 carbon atoms optionally substituted by one or more groups $R^1$;
Ar' is an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$; and
each $R^4$ is a $C_{1-20}$ hydrocarbyl group.

8. The fiber reinforced composition according to claim 7, wherein the polypropylene random copolymer (PP-RACO) is prepared by polymerizing propylene and ethylene and/or $C_{4-8}$ α-olefin in the presence of a catalyst, the catalyst comprising an asymmetrical complex of formula (V) or (V')

(V')

(V)

wherein each X is a sigma ligand;
R' is independently a $C_{1-6}$ alkyl or $C_{3-10}$ cycloalkyl;
$R^1$ is $C_{3-8}$ alkyl;
$R^6$ is hydrogen or a $C_{3-8}$ alkyl group;
$R^{6'}$ is a $C_{3-8}$ alkyl group or $C_{6-10}$ aryl group;
$R^{3'}$ is a $C_{1-6}$ alkyl group, or $C_{6-10}$ aryl group optionally substituted by one or more halo groups; and
n is 0, 1 or 2.

9. A process for preparing the fiber reinforced composition according to claim 1 comprising the steps of adding (a) polypropylene random copolymer (PP-RACO),
(b) the glass fibers (GF), and
(c) the polar modified polypropylene as adhesion promoter (AP) to an extruder and extruding the same obtaining the fiber reinforced composition.

10. An automotive article comprising the fiber reinforced composition according to claim 1.

11. A foamed article comprising the fiber reinforced composition according to claim 1.

* * * * *